April 28, 1942.  M. G. LEONARD  2,281,074
PROTECTIVE DEVICE FOR ELECTRICAL APPARATUS
Filed Sept. 3, 1938  2 Sheets—Sheet 1
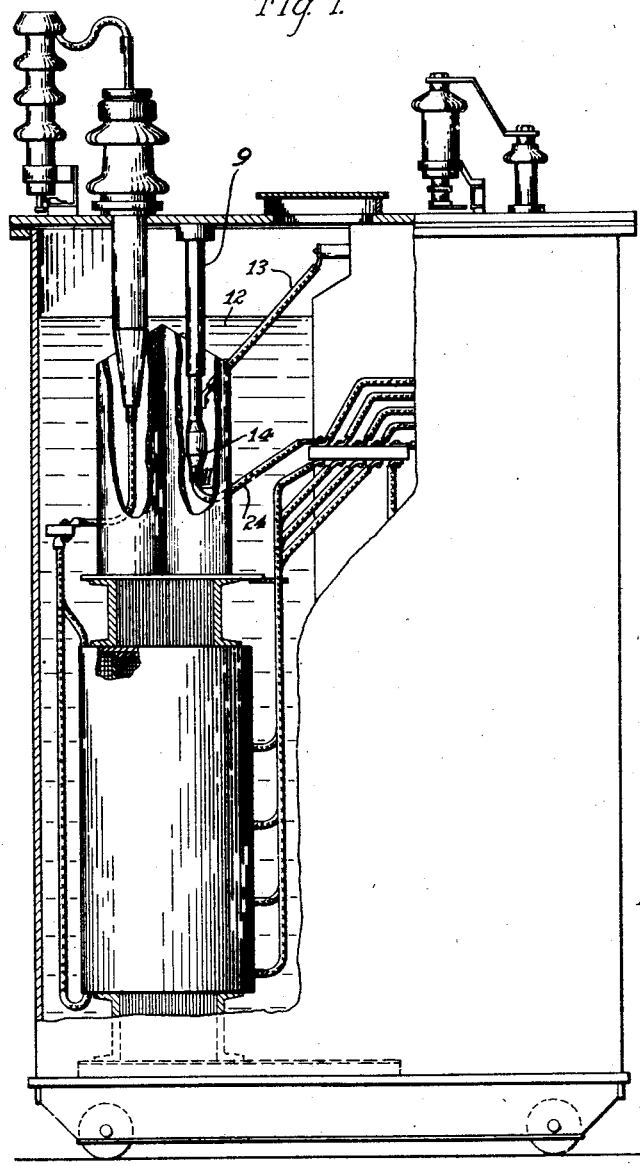
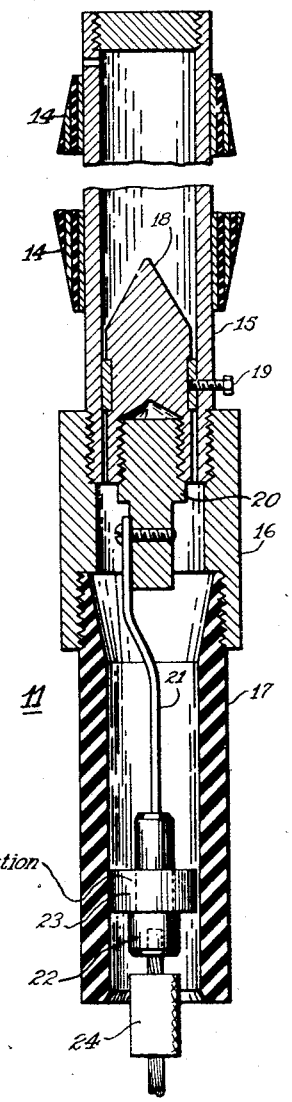
WITNESSES:
INVENTOR
Merrill G. Leonard.
BY
Ezra W. Savage
ATTORNEY April 28, 1942.    M. G. LEONARD    2,281,074
PROTECTIVE DEVICE FOR ELECTRICAL APPARATUS
Filed Sept. 3, 1938    2 Sheets-Sheet 2
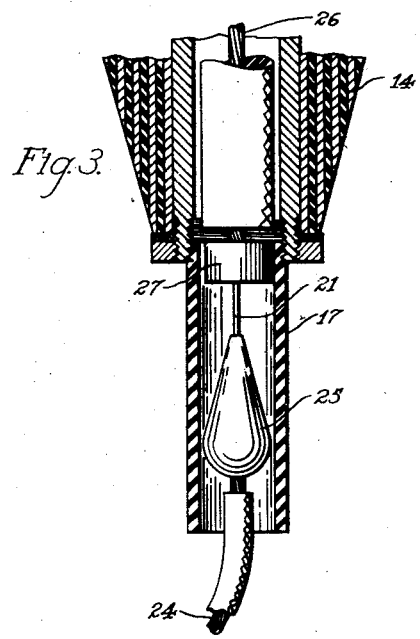
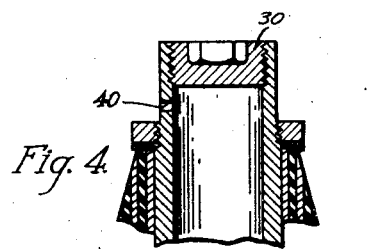
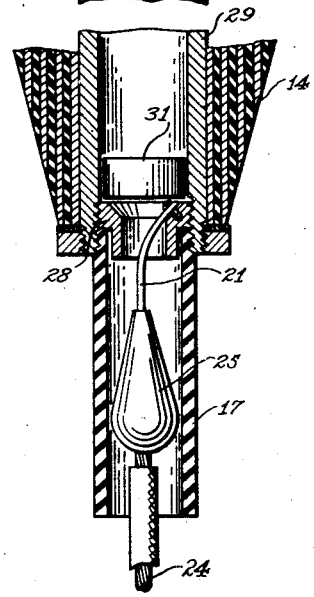
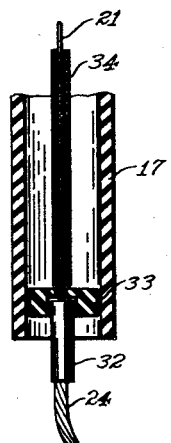
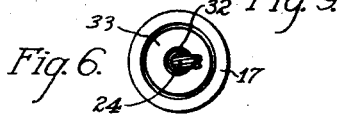
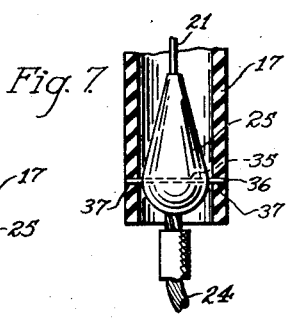
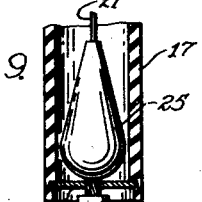
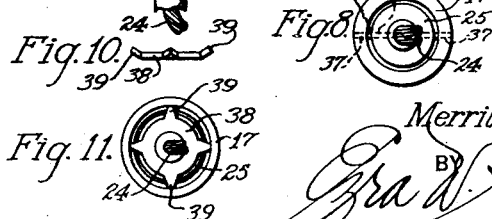
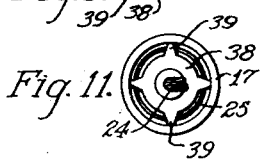
WITNESSES:
INVENTOR
Merrill G. Leonard.
BY
ATTORNEY Patented Apr. 28, 1942

2,281,074

UNITED STATES PATENT OFFICE 2,281,074

PROTECTIVE DEVICE FOR ELECTRICAL APPARATUS

Merrill G. Leonard, Sharon, Pa., assignor to Westinghouse Electric & Manufacturing Company, East Pittsburgh, Pa., a corporation of Pennsylvania Application September 3, 1938, Serial No. 228,334

8 Claims. (Cl. 200—120)

The invention relates generally to protective devices for electrical apparatus and more particularly to the projectiles utilized to cooperate in the interruption of electric arcs.

The object of the invention is to provide for separating the fused portions of a fusible conductor or link provided in electrical apparatus for interrupting a circuit on the development of electrical conditions which are dangerous to the electrical apparatus.

It is also an object of the invention to provide a projectile that may be driven through a dielectric at a high speed to cooperate in the quick interruption of an electrical arc that may be drawn when a fusible conductor is fused as the result of the development of the electrical conditions which exceed the rated value of the fusible conductor.

The invention accordingly is disclosed in the embodiment thereof shown in the accompanying drawings and comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawings in which:

Figure 1 is a view in side elevation of a power transformer with parts cut away showing a protective device constructed in accordance with this invention disposed in proper relation to the transformer coils;

Fig. 2 is a view in cross-section of a protective device provided with a projectile constructed in accordance with this invention;

Fig. 3 is a view partly in side elevation and partly in section of a portion of the protective device showing a streamlined projectile;

Fig. 4 is a view partly in side elevation and partly in cross-section of a protective device provided with a projectile and means for cushioning the shock resulting from the striking of an arc;

Fig. 5 is a view in cross-section showing a modified form of projectile;

Fig. 6 is a view in end elevation of the modification illustrated in Fig. 5; and, Figs. 7 to 11, inclusive, are views illustrating different methods for mounting the projectiles of the protective device.

Referring now to the drawings, the transformer shown generally at 10 is provided with a protective device shown generally at 11 which is immersed in the dielectric 12. The protective device is connected in series circuit relation with the transformer lead 13 in order to protect the transformer coils. In mounting the protective device it may be supported in any suitable manner. In the structure illustrated it is suspended from the insulating member 9 carried by the transformer case.

The protective device may be constructed in many different ways and in the embodiment illustrated in Fig. 2 the tubular member 15 depending from the bushing is threaded to receive an internally threaded coupling 16. A fibre tube 17 having a threaded upper end is threaded into the lower end of the coupling 16.

In order to establish good electrical connection an electrode 18 is supported in a tubular member 15 by means of a set screw 19. A plug 20 is threaded into the lower end the electrode 18 as shown.

The transformer lead 13 shown in Fig. 1 is electrically connected to any of the supporting members in the protective device which is electrically connected to the fusible conductor 21. For example, in the embodiment of the invention illustrated in Fig. 2, the transformer lead 13 would be connected to tubular member 15 or electrode 18 which, in turn, are electrically connected to the fusible conductor 21. Any method well known in the art for making electrical connections between the transformer lead 13 and the members electrically connected to the fusible conductor 21 may be employed.

Depending from the lower end of the plug 20 is a fusible conductor 21. In selecting the fusible conductor 21, the operating conditions and rating of the apparatus to be protected will be considered. The proper practice to be employed in selecting a fusible conductor is clearly set forth in the copending application Serial No. 167,040, filed October 2, 1937, for John K. Hodnette now Patent No. 2,223,726, issued December 3, 1940.

Ordinarily, when a fusible conductor is employed for protecting electrical apparatus and an overload occurs an arc results. When the arc is interrupted, if the gap caused by the destruction of a section of the fusible conductor is not long enough, the arc may restrike and the protective device will not function satisfactorily.

In order to effect a proper separation of the fused portions of the fusible conductor to prevent the restriking of the arc and cooperate in the interruption of the arc, a projectile is provided which may be acted upon by the gases generated when the fusing of the fusible conductor occurred. In the modification illustrated in Fig. 2, a projectile 22 is suspended from the lower end of the fusible conductor 21. This fusible conductor is small in diameter so that it may be projected through a dielectric or other medium at a high velocity.

In order to take full advantage of the gases generated by the fusing of the fusible conductor 21, a disc or piston 23 is mounted on the projectile 22. The disc may be made from fibre or other suitable material while the projectile may be made from some suitable metal.

In suspending the projectile 22 from the fusible conductor 21, any suitable method may be employed as by soldering the projectile to the conductor. The lead 24 which will extend to the electrical apparatus to be protected may be soldered to the lower end of the projectile 22.

The disc or piston 23 may be mounted on the projectile in any suitable manner. In the embodiment illustrated, the projectile 22 is machined to something the shape of a bolt and an opening is provided in the disc 23 to receive the stem of the bolt-shaped projectile.

In operation, when a fusible conductor 21 is fused generating gases, a pressure may be built up on the disc or piston 23 and as soon as the fusing operation has progressed to the point where the pressure can effect a separation of the fusible conductor, the projectile 22 is discharged from the tubular casing 17. Therefore, immediately upon the fusing of the fusible conductor a wide gap is established and if the arc is interrupted there is no danger of it restriking.

When the protective device is immersed in a dielectric such as is commonly utilized with transformers, there is a great resistance offered to the movements of the projectile after the separation of the fused portions of the fusible conductor. Further, the speed with which the fusible conductor is separated is important in the arc interrupting process.

In order to get the best results, it has been found desirable to shape the projectile as shown in Figs. 3, 4, 7 and 9. The projectile 25 illustrated in Fig. 3 is tapered toward the trailing end. When a projectile is so shaped, it will move through the dielectric at a high velocity without drawing any considerable body of the dielectric after it or forming voids. In designing the electrode 25, information may be obtained as to the possible speed at which a projectile will be discharged from the tube 17. With this information and some idea of the deceleration permissible without the restriking of the arc, a design of the electrode can be arrived at which will give very satisfactory results.

The fusible conductor 21 may be attached to the lead conductor 26 in any suitable manner. In the modification illustrated in Fig. 3, the metallic plunger 27 is interposed between the fusible conductor 21 and the lead 26 and both conductors are soldered to it. The plunger 27 is provided in order to give a certain amount of cushioning between the chamber in which the fusible conductor is mounted and the bushing 14. When a fusing operation occurs, the gases generated will act on the plunger 27 forcing it upwardly a short distance thus absorbing the shock of the explosion.

In the modification illustrated in Fig. 4, the projectile 25 is shaped similar to the modification illustrated in Fig. 3. The fusible conductor 21 is connected to a metallic collar 28 disposed in a metallic tube 29 carried by the bushing 14.

The electric circuit through the protective device may be traced as follows: The lead 13, projectile 25, fusible conductor 21, the collar 28 and the tube 29. The electrical connection to the tube 29 may be made in any suitable manner and in this instance is made through the plug 30.

In order to cushion the shock resulting from the fusing of the fusible conductor 21 and the drawing of an arc, a plunger 31 is disposed in the tube 29 which serves as a cylinder. The tube or cylinder 29 may be provided with a vent 40 to control the shock absorbing action in the tube. The size of the vent 40 will be determined from the anticipated operating conditions.

In the operation of the protective device when an arc occurs and gases are generated from the decomposition of the dielectric, the projectile is driven out of the tube separating the fused portions of the fusible conductor 21. The pressure developed in the chamber for the fusible conductor is imposed on the plunger 31 forcing it upward and allowing a rapid expansion of the gases and cushioning the shock thereby protecting the bushing 14. When a vent such as 40 is provided, a certain amount of air or other gases trapped in the cylinder 29 will escape, permitting the plunger 31 to move closer to the end of the cylinder and offering a larger chamber for the expansion of gases.

In the modification illustrated in Figs. 5 and 6, the general construction of the projectile of the protective device is similar to that illustrated in Fig. 2. In this construction, the projectile 32 is made small in diameter so as to offer small resistance to its movement through the dielectric. It is cylindrical in shape and made of some suitable conducting metal that may be readily electrically connected to the fusible conductor 21 and the lead 13. A disc 33 which loosely fits in the tube 17 is perforated so that the fusible conductor 21 may be fitted therethrough into the projectile 32. This disc or piston 33 is made of any suitable material such as fibre. Its function is to present a piston face to the gases generated by the decomposition of the dielectric or otherwise when an arc occurs so as to take advantage of the high pressures developed in order to give the projectile 32 a high velocity to effect a quick separation of the fused portions of the fusible conductor. As soon as the projectile and piston leave the tube they separate. Since the piston is non-conducting, its final disposition is of no importance since it will perform no function in the restriking of an arc.

In this modification of the invention, a small fibre tube 34 is mounted on the fusible conductor 21. The purpose of this tube 34 is to stabilize the performance of the protective device. If this tube were not provided, when the dielectric in which the projectile is immersed reaches a boiling or cracking temperature, a very turbulent condition would result in the neighborhood of the fusible conductor 21. The result would be a very uncertain cooling operation because of the movement of the dielectric. When the tube 34 is provided, and the dielectric begins to decompose, the gases generated clear the tube of the dielectric and a constant cooling process takes place. The result is that the performance of the fusible conductor when provided with a tube can be predetermined with great accuracy for known operating conditions.

In the operation of protective devices, it has been found desirable to provide some means for cooperating in the building up of predetermined pressures on the projectile before it is discharged from the tube 17 and to support the projectile when a fusible conductor which is weak mechanically is employed. Many suitable devices may be provided for performing this function. In Figs. 7 and 8 the projectile has an opening 35 drilled therethrough and a pin 36 is disposed to extend through openings 37 in the tube 17 and the opening 35 in the projectile. In operation, as soon as the pressure in the tube 17 reaches a predetermined value, it disengages the pin from the walls of the tube and discharges the projectile.

A type of support for the projectile for retaining it in the position which has been found to be satisfactory in quantity production is shown in Figs. 9, 10 and 11. In this structure, a plate 38 is stamped from some suitable metallic material. This plate has projections 39 which simulate a saw-tooth. The body of the plate 38 is made of a diameter slightly less than the diameter of the inside of the tube 17. The projections 39 are bent upwardly slightly as shown in Fig. 10. In mounting the plate, it is inserted in the lower end of the tube 17 and pressure applied forcing the saw-tooth projections 39 into the wall of the tube and flattening the plate out as illustrated in Fig. 9. In some instances the lower end of the tube 17 may be counterbored as illustrated in Fig. 9 to facilitate the pressing of the teeth into the tube wall.

In operation, when a predetermined pressure is developed upon the projectile 25, the supporting plate illustrated in Figs. 10 and 11 is dislodged from engagement with the tube 17 and the projectile discharged at a high velocity. Since the body 38 of the plate is no greater in diameter than the projectile it does not materially increase the resistance to the travel of the projectile through the dielectric liquid.

Since certain changes may be made in the above article and different embodiments of the invention can be made without departing from the scope thereof, it is intended that all matter contained in the above description or shown in the accompanying drawings shall be interpreted as illustrative and not in a limiting sense.

I claim as my invention:

1. In a protective device for electrical apparatus provided with a dielectric, in combination, a fusible conductor, a tubular casing for the fusible conductor, a projectile connected to the fusible conductor and disposed in a tubular casing, the projectile being so disposed that it may be driven from the tubular casing when acted upon by the gases generated by the fusing of the fusible conductor, a piston disposed for movement in the tubular casing carried by the projectile, the piston being loosely mounted on the projectile whereby when they are driven from the tubular casing they will separate and the projectile will travel at a high speed effecting a quick separation of the fused portions of the fusible conductor.

2. In a protective device for electrical apparatus provided with a dielectric, in combination, a tubular casing, a fusible conductor disposed in the tubular casing with at least a portion immersed in the dielectric, a projectile connected to the fusible conductor, the diameter of the projectile being smaller than the internal diameter of the tubular casing and so disposed that it may be driven out of the tubular casing when acted upon by gases generated by the fusing of the fusible conductor, and means disposed between the casing and projectile cooperative for offering a predetermined resistance to the discharge of the projectile.

3. In a protective device for electrical apparatus, in combination, a projectile, a tubular casing in which the projectile is mounted, and a support disposed in the tubular casing carrying the projectile, the support being of sufficient strength to withstand a predetermined gas pressure before being driven from the tubular casing.

4. In a protective device for electrical apparatus and provided with a dielectric, in combination, a fusible conductor at least a portion of which is immersed in a dielectric, a projectile connected to the fusible conductor, the projectile having a tapered trailing end, a tubular casing in which the fusible conductor and projectile are disposed, a support for the projectile disposed in the tubular casing, the support being so proportioned that a predetermined gas pressure will be built up on the projectile before the support is released from the casing, the taper of the trailing end of the projectile being so proportioned as to reduce the deceleration of the projectile through the dielectric to a minimum thereby to obtain a high speed separation of the fused portions of the fusible conductor and a flow of dielectric toward the arc stream.

5. In a protective device for electrical apparatus provided with a body of dielectric, in combination, a fusible conductor which will fuse when subjected to predetermined electrical conditions, a case for the fusible conductor, a projectile connected to the fusible conductor disposed in the case, the case having an opening therein to permit the entry of the dielectric and the exit of the projectile and being so disposed that at least a portion of the fusible conductor is immersed in the dielectric and a collar associated with the projectile cooperative to impose substantially the full force of pressures developed in the case upon the projectile to project it through the body of dielectric when the fusible conductor is fused the collar being so disposed on the projectile that it may separate from the projectile when discharged from the case.

6. In a protective device for electrical apparatus provided with a dielectric liquid, in combination, a fusible conductor which will fuse when subjected to predetermined electrical conditions, a case for the fusible conductor, a projectile disposed in the case and connected to the fusible conductor, the case having an opening through which the projectile may move on the development of pressure upon the fusing of the fusible conductor, shock absorbing means disposed in the case, the fusible conductor being disposed between the shock absorbing means and the projectile and having at least a portion immersed in the body of dielectric liquid, the projectile being so disposed that when an arc occurs, it is driven through the body of the dielectric liquid to effect a separation of the fused parts of the fusible conductor and to quench the arc in the dielectric liquid.

7. In a protective device for electrical apparatus provided with a dielectric liquid, in combination, a fusible conductor which will fuse when subjected to predetermined electrical conditions, a tubular case for the fusible conductor, a projectile disposed in the case and connected to the fusible conductor, the tubular case having an open end through which the projectile may be driven on the development of pressure as a result of the fusing of the fusible conductor, a plunger disposed in the tubular case, the fusible conductor being disposed between the plunger and projectile, the projectile and at least a portion of the fusible conductor being immersed in the body of the dielectric liquid whereby when an arc occurs, severing the fusible conductor, the projectile is driven through the body of liquid dielectric to effect a separation of the fused parts of the fusible conductor and to utilize the dielectric liquid to extinguish the arc, the plunger functioning to cushion the reactive forces.

8. In a protective device for electrical apparatus provided with a body of dielectric liquid, in combination, a fusible conductor which will fuse when subjected to predetermined electrical conditions, a case for the fusible conductor, a tubular member disposed on the fusible conductor to cooperate in predetermining the conditions under which the fusible conductor will fuse, a projectile carried by the fusible conductor, the case having an opening therein constituting an exit for the fusible conductor, a piston carried by the projectile, the fusible conductor, projectile and piston being immersed in the body of dielectric liquid whereby when the fusible conductor is fused and pressures generated, the projectile is driven through the body of the dielectric to cooperate in effecting a separation of the fused portions of the fusible conductor and to extinguish the arc in the liquid dielectric, the piston cooperating to impose substantially the full force of pressures generated on the projectile.

MERRILL G. LEONARD.